UNITED STATES PATENT OFFICE

2,461,959
CATALYTIC HYDROGENATION OF TRIISOBUTYLENE

Richard C. Brandon, Elizabeth, N. J., assignor to Standard Oil Development Company, a corporation of Delaware No Drawing. Application June 15, 1946, Serial No. 677,093

1 Claim. (Cl. 260—683.6)

The manufacture of aviation fuel having a high octane rating and high flash point is of value in reducing fire hazards. It is known that fuel of this type can be produced by hydrogenating isobutylene trimer and other branched olefin polymers boiling in the range 250° F. to 400° F.

The methods hitherto employed for hydrogenating the polymers have had certain disadvantages, because the polymers contain small amounts of sulfur and peroxides. In using sulfur-resistant catalysts, such as chromium or molybdenum oxides, hydrogenation has to be carried out at temperatures so high that cracking and depolymerization of the feed stock takes place, leading to excessive formation of low boiling product and lowered yields. A nickel hydrogenation catalyst is effective at below cracking temperatures but is poisoned by traces of sulfur in the polymer and has a catalyst life too short for commercial use.

An object of this invention is to provide a method of hydrogenating the polymers under mild temperature and pressure conditions over a catalyst which retains its activity in treating sulfur-containing feed stocks.

Another object is to provide a method of obtaining partial to complete saturation of the polymers with negligible amount of cracking and obtaining a simultaneous reduction in sulfur content.

In accordance with the present invention, highly satisfactory catalysts for hydrogenating isobutylene trimer and similar polymers are prepared by depositing a small amount of a precious platinum group metal, preferably platinum or palladium, on a porous inorganic carrier, such as alumina.

Suitable conditions for the hydrogenation have been ascertained by tests at temperatures ranging from 200° F. to 600° F. and pressures from 1 atmosphere to 50 pounds per square inch gauge. In general, these tests indicate that at 200° F. and atmospheric pressure only slight hydrogenation of the unsaturated hydrocarbons occurs. Increasing the temperature to 400° F. brings about complete saturation of the olefin polymers. At about 600° F. slight cracking begins to appear. Some increase in hydrogenation occurs at a given temperature for a given feed rate and catalyst with increase of pressure, but at an optimum temperature for complete saturation an elevated pressure is unnecessary. To obtain complete saturation an excess of hydrogen is used, i. e., in excess of the stoichiometrical proportion required for complete hydrogenation.

As shown by results in the following table, operation at 400° F. and atmospheric or moderate superatmospheric pressure gives complete saturation of olefin polymers in a typical trimer fraction obtained by sulfuric acid polymerization of butenes.

*Hydrogenation of trimer over precious metal catalysts*

| Run Number | (Feed) | PMC-22 | PMC-23 | PMC-27 | PMC-28 |
|---|---|---|---|---|---|
| Operating Conditions: | | | | | |
| Catalyst | | 2% Pd on $Al_2O_3$ | | 2% Pt on $Al_2O_3$ | |
| Temperature, °F | | 400 | 400 | 400 | 400 |
| Pressure, lbs./sq. in | | 50 | Atm. | 50 | Atm. |
| Naphtha Feed Rate, V/V/Hr | | 1.0 | 1.0 | 1.0 | 1.0 |
| Hydrogen Feed Rate, CF/B | | 1,500 | 1,500 | 1,500 | 1,500 |
| Length of Run, Hrs | | 4 | 4 | 4 | 4 |
| Catalyst Age, Hrs | | Nil | 4 | Nil | 4 |
| Yields from 35 Plates/10 Ref. Ratio Distillation: | | | | | |
| Light Ends<215° F | 2.0 | 4.0 | 4.0 | 4.0 | 4.0 |
| Dimer 215–221° F | 2.5 | 1.4 | 1.4 | 2.0 | 1.0 |
| Intermediate Cut 221–350° F | 12.0 | 10.0 | 8.0 | 6.0 | 8.0 |
| Trimer 350–355° F | 73.6 | 74.6 | 76.6 | 78.0 | 77.0 |
| Bottoms [1] | 10.0 | 10.0 | 10.0 | 10.0 | 10.0 |
| Total Condensate Inspections: | | | | | |
| Bromine No., cg/g | 56.5 | Nil | Nil | Nil | Nil |
| Density, 20/4° C | 0.757 | 0.744 | 0.743 | 0.743 | 0.743 |
| Turbidimetric Sulfur, Weight Percent | 0.0039 | 0.0024 | 0.0013 | 0.0002 | 0.0002 |
| Gravity, °API | 54.5 | 58.0 | 58.1 | 57.5 | 58.0 |
| Distillation: | | | | | |
| I. B. P., °F | 266 | 278 | 277 | 280 | 277 |
| 5% | 307 | 298 | 306 | 302 | 297 |
| 10 | 318 | 315 | 316 | 315 | 316 |
| 50 | 343 | 345 | 344 | 342 | 343 |
| 90 | 346 | 349 | 347 | 347 | 348 |
| F. B. P., °F | 349 | 365 | 372 | 363 | 351 |
| Recovery, Percent | 98.5 | 98.0 | 98.0 | 98.5 | 98.0 |
| Loss, Percent | 0.4 | 0.9 | 1.2 | 0.7 | 0.8 |
| Trimer Cut Inspections: | | | | | |
| Bromine No., cg/g | 57.9 | Nil | Nil | Nil | Nil |
| Density, 20/4° C | 0.758 | 0.746 | 0.746 | 0.746 | 0.746 |
| Olefins, vol. percent | 61 | Nil | Nil | Nil | Nil |
| Turbidimetric Sulfur, Weight Percent | 0.0016 | 0.0004 | 0.0003 | 0.0001 | 0.0000 |
| Avia. Oct. No.+4 ml. TEL/gal | 89.8 | +1.23 | +1.71 | +1.60 | +1.67 |
| Octane No. Aviation ASTM | 89.8 | 108 | 110 | 109 | 109 |

[1] A 10% bottoms fraction was taken in all runs for convenience in distillation but the material contains substantially all trimer.

It is demonstrated by results shown in the table that the aviation octane number with 4 ml. of tetraethyl lead (TEL) per gallon was increased from about 90 to a level of iso-octane plus 1.6 ml. of TEL per gallon which corresponds to a rating of about 109. Precise fractionation of the products showed that no measurable amount of cracking took place. Thus, the expense of refractionation can be eliminated and a substantial saving is made in avoiding loss from cracking.

Catalytic materials used in obtaining the tabulated results contain 2% by weight of the precious metals platinum and palladium on alumina in the form of compressed cylindrical pellets of about 1/8 x 1/8-inch size; however, variations may be made in the shape, size, ingredients, and proportions as will be explained.

To prepare the catalytic materials for the purpose of the present invention, a small amount of the platinum group noble metal selected from the class consisting of platinum and palladium, e. g., 0.1 to 10% by weight, is incorporated with a carrier of the nature of alumina, which is a hydrous oxide having ultra-miscroscopic pores. Silica gel is another example of this type of carrier.

Two types of procedure may be used for incorporating the platinum group metal, finely divided or of colloidal size, with the carrier: (1) impregnation of the carrier with a salt or acid solution (e. g., ammonium chloroplatinate or chloroplatinous acid), followed by a slow drying, and heat decomposition or reduction of the deposited compound; and (2) mulling of the carrier in powdered form with finely divided or colloidal particles of the metal (e. g., platinum black), followed by extruding or pilling. The mulled mixture is extruded wet, then dried. The pilled mixture is dry when compressed into the compact form of a pill or pellet. The compact form is preferred for the present method.

The pelleted catalytic material may be used in a fixed bed type of operation, or the compact material may be granulated to smaller size for use with a moving or fluid catalyst technique.

Catalytic materials used in carrying out the method of the present invention are very resistant to the poisonous action of the sulfur compounds, organic peroxides, and other unsaturated polymers commonly present with the branched olefin polymers. These catalytic materials have been used in operations lasting over 100 hours without loss of activity. They can be satisfactorily regenerated by controlled burning of carbonaceous deposits which tend to form at elevated temperatures.

I claim:

In a continuous process of producing high antiknock aviation fuel from a sulfur-contaminated triisobutylene, the improvement which comprises reacting the polymer with hydrogen at a temperature in the range of above about 200° F. but below about 600° F. during contact with a compact catalytic material of a hydrous alumina carrier having ultramicroscopic pores supporting 0.1 to 10% by weight of a finely-divided platinum group noble metal selected from the class consisting of platinum and palladium and continuously employing said catalyst for an extended period of time up to 100 hours or more without substantial loss of activity.

RICHARD C. BRANDON.

REFERENCES CITED

The following references are of record in the file of this patent:

UNITED STATES PATENTS

| Number | Name | Date |
|---|---|---|
| 2,142,937 | Deanesly et al. | Jan. 3, 1939 |
| 2,143,364 | Taylor | Jan. 10, 1939 |
| 2,332,572 | Hepp et al. | Oct. 26, 1943 |
| 2,396,753 | Rosen et al. | Mar. 19, 1946 |

OTHER REFERENCES

Lebedew et al.: Berichte, vol. 63, Jan. 8, 1930, pages 103 to 112 (English translation—8 pp.).